United States Patent
Wasenczuk (10) Patent No.: US 11,152,843 B2
(45) Date of Patent: *Oct. 19, 2021

(54) ELECTROMECHANICAL GENERATOR FOR CONVERTING MECHANICAL VIBRATIONAL ENERGY INTO ELECTRICAL ENERGY

(71) Applicant: Perpetuum Ltd, Romsey (GB)

(72) Inventor: Adam Wasenczuk, Romsey (GB)

(73) Assignee: Perpetuum Ltd, Romsey (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/042,078

(22) PCT Filed: Mar. 22, 2019

(86) PCT No.: PCT/EP2019/057199
§ 371 (c)(1),
(2) Date: Sep. 25, 2020

(87) PCT Pub. No.: WO2019/185464
PCT Pub. Date: Oct. 3, 2019

(65) Prior Publication Data
US 2021/0099064 A1 Apr. 1, 2021

(30) Foreign Application Priority Data
Mar. 27, 2018 (GB) .................................. 1804868

(51) Int. Cl.
*H02K 35/02* (2006.01)
(52) U.S. Cl.
CPC .................... *H02K 35/02* (2013.01)
(58) Field of Classification Search
CPC ........ H02K 35/00; H02K 35/02; H02K 35/04; H02K 33/00; H02K 33/02
USPC ................... 310/12.12, 12.01, 12.04, 20, 37
See application file for complete search history.

(56) References Cited

U.S. PATENT DOCUMENTS 7,586,220 B2    9/2009  Roberts
2010/0327672 A1* 12/2010  Roberts ................. H02K 1/34
                                                        310/25

FOREIGN PATENT DOCUMENTS

GB          2469347 A        10/2010

OTHER PUBLICATIONS

International Preliminary Report on Patentability for PCT/EP2019/057199 dated Sep. 29, 2020 (7 pages).

* cited by examiner

*Primary Examiner* — Tulsidas C Patel
*Assistant Examiner* — Robert E Mates
(74) *Attorney, Agent, or Firm* — Brandon V. Zuniga; James R. Gourley; Carstens & Cahoon, LLP (57) ABSTRACT

An electromechanical generator for converting mechanical vibrational energy into electrical energy, the electromechanical generator comprising: a central mast, an electrically conductive coil assembly fixedly mounted to the mast, a magnetic core assembly movably mounted to the mast for linear vibrational motion a biasing device mounted between the mast and the magnetic core assembly, the biasing device comprising a pair of first and second plate springs, and a resilient device mounted between the biasing device and the magnetic core assembly, the resilient device being configured to be deformed between the biasing device and the magnetic core assembly when the magnetic core assembly has moved, by the linear vibrational motion, away from an equilibrium position by a predetermined non-zero threshold amplitude, the resilient device comprising a pair of first and second flat spring elements, each having an outer edge fitted to the magnetic core assembly and a free inner edge.

17 Claims, 3 Drawing Sheets

ELECTROMECHANICAL GENERATOR FOR CONVERTING MECHANICAL VIBRATIONAL ENERGY INTO ELECTRICAL ENERGY

CROSS REFERENCE TO RELATED APPLICATION

This application is a US 371 application from PCT/EP2019/057199 entitled "An Electromechanical Generator for Converting Mechanical Vibrational Energy into Electrical Energy" filed on Mar. 22, 2019 and published as WO 2019/185464 A1 on Oct. 3, 2019, which claims priority to GB Application 1804868.6 filed on Mar. 27, 2018. The technical disclosures of every application and publication listed in this paragraph are hereby incorporated herein by reference.

BACKGROUND TO THE INVENTION

The present invention relates to an electromechanical generator for converting mechanical vibrational energy into electrical energy, i.e. a vibration energy harvester. In particular, the present invention relates to such a vibration energy harvester which is a miniature generator capable of converting ambient vibration energy into electrical energy for use, for example, in powering intelligent sensor systems. Such a vibration energy harvester can be used in many areas where there is an economical or operational advantage in the elimination of power cables or batteries.

DESCRIPTION OF THE PRIOR ART

It is known to use vibration energy harvesters comprising an electromechanical generator for harvesting useful electrical power from ambient vibrations, e.g. for powering wireless sensors. A typical magnet-coil generator consists of a spring-mass combination attached to a magnet or coil in such a manner that when the system vibrates, a coil cuts through the flux formed by a magnetic core.

The amount of vibration in the environment of a vibration energy harvester can vary by several orders of magnitude. The extent of this variability can be described as a 'dynamic range'. The electromechanical generator may, in use, be subjected to a large shock force or vibration that causes the sprung mass to vibrate with excessively large amplitude, with result that the mass may physically impact upon the outer casing of the device, or other components, at the limit of travel of the sprung mass. The electromechanical generator needs to accommodate the possibility that the amplitude of vibration or oscillation of the sprung mass may vary with time, in an intermittent and unpredictable manner, to avoid or minimise the possibility of damage from unsafe amplitudes, in order to achieve an enhanced operating lifetime.

Reliable harvester function when subjected to a large dynamic range requires accurate control of the motion of the moving mass. This is achieved by storing and dissipating energy in elastic elements.

For example, the Applicant's earlier WO-A-2014/076143 discloses a vibration energy harvester in the form of an electromechanical generator in which a resilient device, for example in the form of a frustoconical spring, similar to a Belleville washer, is located between the spring and mass of the spring-mass combination or between the spring and a body containing the spring-mass combination. The frustoconical spring is configured to be deformed only when the oscillation amplitude exceeds a predetermined non-zero threshold amplitude. Herein, by "non-zero" it is meant that the predetermined threshold amplitude is not zero amplitude. However, when the oscillation amplitude exceeds the predetermined threshold amplitude, such as when the energy harvester is subjected to a severe shock, the resilient device is then deformed, e.g. compressed, between the biasing device and the one of the mass and the body, to act as a limiter that limits the oscillation amplitude. The resilient device provides that the known electromechanical generator has particular utility in environments where the device may be subjected to occasional severe shocks.

However, the added complexity of frustoconical springs increases the difficulty of manufacture. Specifically, the distance which the mass can move before the frustoconical springs begin to act must be achieved accurately. This 'gap' is a small difference between the lengths of two assemblies, and the tolerance of the gap is therefore the sum of a number of component tolerances.

A known solution is to assemble imprecise components in positions defined by precision tools. However, in the case of an energy harvester, the size of the in-service forces means that the joints must be especially secure, and so precision assembly of imprecise components is therefore largely impractical in this instance. In an energy harvester, the component locations are determined by the dimensions of other components. Consequently, the fundamental structure and design of the energy harvester is important for achieving a device which not only has a highly accurate assembly but also is readily manufactured.

The known frustoconical springs disclosed in WO-A-2014/076143 are complex to manufacture accurately and to use in service. Each frustoconical spring must be flexibly retained against a hard-face bearing element by another compliant component, such as another spring, to allow deformation of the frustoconical spring under load without any unwanted motion. The frustoconical spring is typically formed plastically from a flat sheet, for example of spring metal, and the final dimensions depend substantially on material properties such as the yield strength which are subject to variability. Any adjustment of springs after forming is complicated by their inherent compliance. The ability of frustoconical springs to support large axial loads elastically, in a compact volume, is well known. However, there is a problem in providing a spring design which can achieve improved performance as compared to the known use of frustoconical springs, and is still easy to manufacture and incorporate into an accurate energy harvester design.

There is a need in the art to provide an electromechanical generator which incorporates a resilient device, to limit vibration as a result of a large shock force or vibration that could otherwise cause the sprung mass to vibrate with excessively large amplitude, which overcomes the problems of the known resilient device, for example incorporating a frustoconical spring as described above.

SUMMARY OF THE INVENTION

The present invention aims at least partially to provide an energy harvester in the form of electromechanical generator which can reliably be subjected to a large dynamic range to provide accurate control of the motion of the moving mass, yet is easy to manufacture in a practical manner.

The present invention accordingly provides an electromechanical generator for converting mechanical vibrational energy into electrical energy, the electromechanical generator comprising: a central mast, an electrically conductive coil assembly fixedly mounted to the mast, the coil assembly at least partly surrounding the mast, a mount for the coil assembly extending radially inwardly of the coil assembly and fixing the coil assembly to the mast, a magnetic core assembly movably mounted to the mast for linear vibrational motion along an axis about an equilibrium position on the axis, the magnetic core assembly at least partly surrounding the coil assembly and the mast, a biasing device mounted between the mast and the magnetic core assembly to bias the magnetic core assembly in opposed directions along the axis towards the equilibrium position, the biasing device comprising a pair of first and second plate springs, each of the first and second plate springs having an inner edge respectively fitted to first and second opposite ends of the mast and an outer edge fitted to the magnetic core assembly, the outer edge of the first plate spring being fitted to a first end part of the magnetic core assembly and the outer edge of the second plate spring being fitted to a second end part of the magnetic core assembly, and a resilient device mounted between the biasing device and the magnetic core assembly, the resilient device being configured to be deformed between the biasing device and the magnetic core assembly when the magnetic core assembly has moved, by the linear vibrational motion, away from the equilibrium position by a predetermined non-zero threshold amplitude, the resilient device comprising a pair of first and second flat spring elements, each of the first and second flat spring elements having an outer edge fitted to the magnetic core assembly and a free inner edge spaced radially outwardly from the mast and spaced axially inwardly of the respective first and second plate spring.

Preferred features are defined in the dependent claims.

The present invention is predicated on the finding that a flat annular spring can be employed as a resilient device to limit excessive vibration. The flat annular spring can be readily manufactured with low cost and low complexity to provide a flat spring with highly accurate constant thickness. By employing a flat annular spring as a resilient device, a hard-face hearing element, and another compliant component, are not required. Sliding motion between the resilient device and any other component can be avoided or at least minimised, which eliminates or minimizes contact wear.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

The electromechanical generator of the present invention is a resonant generator known in the art as "velocity-damped" where substantially all of the work done by the movement of the inertial mass relative to the housing is proportional to the instantaneous velocity of that movement. Inevitably, a portion of that work is absorbed overcoming unwanted mechanical or electrical losses, but the remainder of the work may be used to generate an electrical current via a suitable transduction mechanism, such as the electrical coil/magnetic assembly described below.

Figure 1:
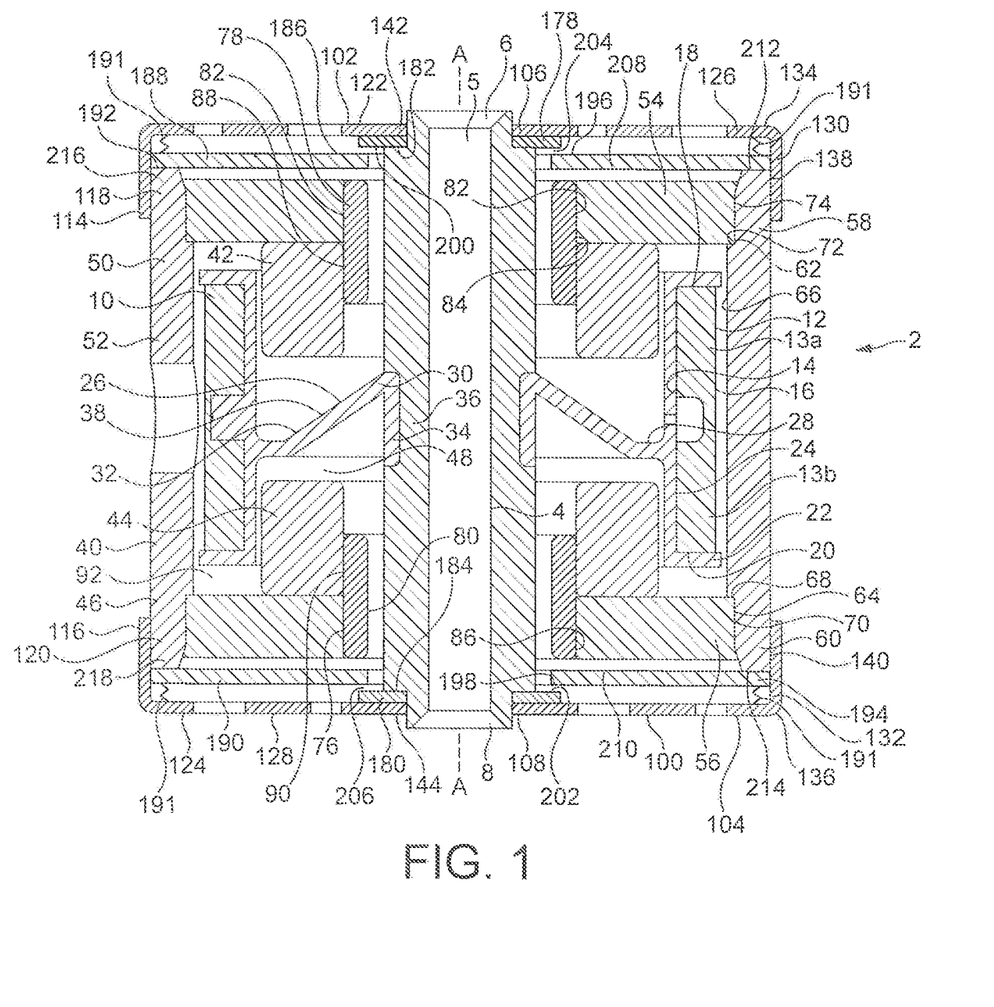
FIG. 1 is a schematic side section through an electromechanical generator for converting mechanical vibrational energy into electrical energy in accordance with a first embodiment of the present invention.
Figure 2:
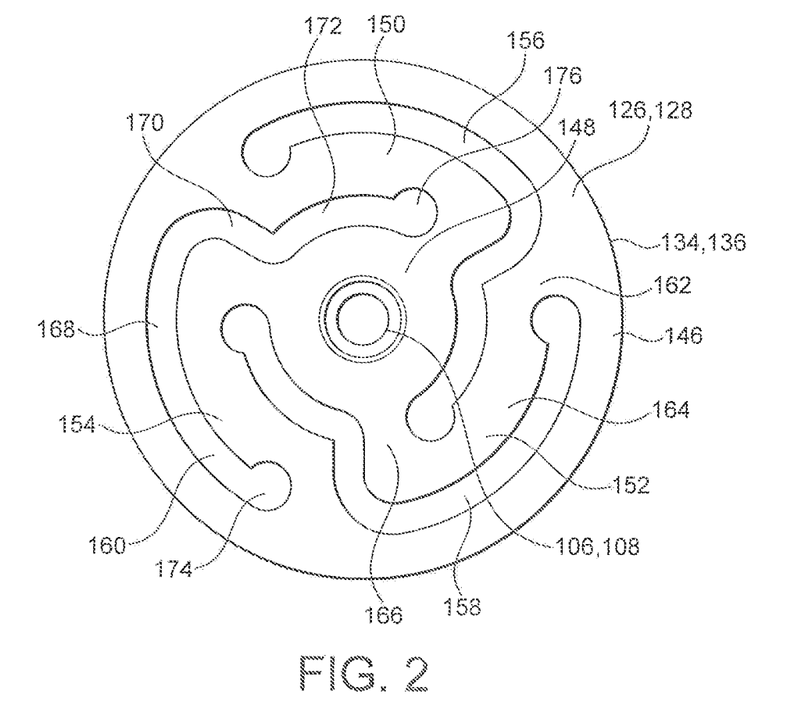
FIG. 2 is a schematic plan view of a spring in the electromechanical generator of FIG. 1.

FIGS. 1 and 2 illustrate an electromechanical generator 2 for converting mechanical vibrational energy into electrical energy in accordance with a first embodiment of the present invention. In operation, the electromechanical generator 2 is enclosed within a housing (not shown) and the device is provided with a fitting (not shown) for securely mounting the electromechanical generator 2 to a support (not shown) from which support mechanical vibrational energy is harvested which is converted into electrical energy by the electromechanical generator 2.

The electromechanical generator 2 comprises a central mast 4 extending along a longitudinal axis A-A. In use, the amplitude of the input mechanical vibrational energy is typically along, or has a component extending along, the longitudinal axis A-A. The opposite ends 6, 8 of the mast 4 are fitted to the housing (not shown) and one or both ends 6, 8 of the mast 4 may be provided with a fitting (not shown), for example a threaded hole, for securely mounting the electromechanical generator 2 to a support, or to a housing.

Preferably the mast 4 is made from a low-permeability, low-conductivity, but high-elastic-modulus material such as 316 stainless steel. The mast 4 may be at least partly hollow, with a central hollow bore 5.

An electrically conductive coil assembly 10 is fixedly mounted to the mast 4. The coil assembly 10 at least partly, preferably wholly, surrounds the mast 4. The assembly 10 comprises an electrically conductive coil 12 which is circular and is coaxial with the mast 4. The assembly 10 has radially inner and outer sides 14, 16, the sides 14, 16 extending parallel to the axis of rotation A-A. The assembly 10 has first and second (typically upper and lower) opposite edges 18, 20. The coil 12 has first and second coil portions 13a, 13b respectively located adjacent to the first and second opposite edges 18, 20.

A mount 22 for the coil assembly 10 extends radially inwardly of the coil assembly 10 and fixes the coil assembly 10 to the mast 4. The mount 22 extends radially inwardly of the radially inner side 14. The coil 12 is mounted within an annular coil support 24 of the mount 22. In this specification the term "annular" means "ring-like" but does not imply any other specific geometric shape and does not imply that the plan view of any annular element must be rounded; for example the sides of the "annular" or "ring-like" element may be straight. In the illustrated embodiment, the annular coil support 24 is preferably circular in plan, but may be any other ring-like geometric shape. Similarly, the other annular elements described herein are also preferably circular in plan, but may be any other ring-like geometric shape. This assembly 10 mounts the coil 12 in a fixed position within the housing. The coil support 24 is located outwardly in a radial direction from the axis A-A, and also substantially midway in an axial direction between the ends 6, 8 of the mast 4.

The mount 22 comprises a conical wall 26 extending between the coil assembly 10 and the mast 4. The conical wall 26 is integral with the annular coil support 24. The annular coil support 24 includes a radially oriented inner wall 28 which connects to the conical wall 26. The conical wall 26 is a moulded body, preferably injection moulded, composed of a thermoplastic material, and the moulded body comprises the annular coil support 24 and the conical wall 26. Preferably the thermoplastic material is a very low-conductivity material, such as glass-loaded plastic.

The conical wall 26 has opposite first and second ends 30, 32. The first end 30 has a smaller diameter than the second end 32. The first end 30 is mounted to the mast 4 and the second end 32 is mounted to the coil assembly 10. The mount 22 further comprises an inner wall 34 integral with the first end 30. The inner wall 34 is arcuate, or curved, and fitted around at least a portion of the circumference of a middle portion 36 of the mast 4.

In the illustrated embodiment, the conical wall is inclined at an angle of from 40 to 50 degrees to the axis A-A, typically at an angle of about 45 degrees to the axis A-A. Preferably, a central part 38 of the conical wall 26 is located substantially midway in an axial direction along the mast 4.

The mount 22 for the coil assembly 10 preferably defines a recess (not shown) in which is received circuitry (not shown) for electrically conditioning the electrical output of the coil 12, for example by voltage regulation. The circuitry is preferably encapsulated by a plastic or rubber sealing material, which seals and protects the circuitry against undesired environmental influences, such as humidity, liquids, etc. The coil 12 is connected the circuitry by wires (not shown) and in turn the circuitry has second wires (not shown) extending therefrom for connecting to external circuitry (not shown).

A magnetic core assembly 40 is movably mounted to the mast 4 for linear vibrational motion along the axis A-A about an equilibrium position on the axis A-A, the equilibrium position being illustrated in FIG. 1. The magnetic core assembly 40 at least partly, preferably wholly, surrounds the coil assembly 10 and the mast 4.

The magnetic core assembly 40 comprises two opposed magnetic circuits spaced along the axis A-A. In the illustrated embodiment, the magnetic core assembly 40 comprises a pair of axially aligned annular first and second magnets 42, 44 spaced along the axis A-A. The magnets 42, 44, are each typically a rare earth permanent magnet having a high magnetic field strength. Poles of the magnets 42, 44 having a first common polarity face towards each other, and poles of the magnets 42, 44 facing away from each other are of a second common polarity.

A ferromagnetic body 46 contacts and is magnetically coupled to the poles of the magnets 42, 44 facing away from each other. Generally, the ferromagnetic body 46 extends radially outwardly of the magnets 42, 44 relative to the axis. The ferromagnetic body is generally tubular and has radially inwardly extending arms at each end thereof, each arm mounting a respective magnet 42, 44 thereon.

The magnets 42, 44 are mounted on opposite sides of, in FIG. 1 above and below, the conical wall 26 and radially inwardly of the coil 12. The magnets 42, 44 are each axially spaced from the conical wall 26, and define a gap 48 through which the mount 22, in particular conical wall 26, extends. The magnets 42, 44 are aligned so that their identical poles face each other on opposite sides of the conical wall 26.

The magnetic core assembly 40 comprises an outer core 50, comprising a one-piece tubular body 52, which encloses the electrically conductive coil assembly 10 on the radially outer side 16. The tubular body 52 is cylindrical.

The magnetic core assembly 40 further comprises first and second end cores 54, 56 contacting and magnetically coupled to the outer core 50 at respective opposite first and second ends 58, 60 of the outer core 50. The first and second end cores 54, 56 extend radially inwardly and enclose the respective first and second opposite edges 18, 20 of the coil assembly 10. The magnetic core assembly 40 further comprises the first and second magnets 42, 44 spaced along the axis A-A. The first and second magnets 42, 44 contact and are magnetically coupled to the respective first and second end cores 54, 56. The first and second coil portions 13*a*, 13*b* are respectively at least partly located between the outer core 50 of the common ferromagnetic body and one of the magnets 42, 44.

The first and second ends 58, 60 of the tubular body 52 each comprise a recess 62, 64 on an inner side 66 of the tubular body 52. The first and second end cores 54, 56 are fitted in the recess 62, 64 of the respective first and second ends 58, 60 of the tubular body 52.

The recess 62, 64 has a transverse mounting surface 68 facing along the axis A-A away from the equilibrium position and a longitudinal mounting surface 70 facing towards the axis A-A. Radial and circumferential surfaces 72, 74 of the respective first and second end cores 54, 56 are respectively fitted to the transverse and longitudinal mounting surfaces 68, 70.

The first and second end cores 54, 56 comprise plates. The first and second end cores 54, 56 may be planar or may be provided with some three-dimensional shaping on the outer or inner surfaces. The first and second end cores 54, 56 are circular, each having an outer circumferential surface 74 fitted to an inner circumferential surface, which is the longitudinal mounting surface 70, of the outer core 50 and a central hole 76 surrounding the mast 4. In the illustrated embodiment the first and second end cores 54, 56 are circular discs which are fitted into the ends of the tubular body 52. The circular circumference of the first and second end cores 54, 56 may be axially fitted to shoulders, formed by the transverse and longitudinal mounting surfaces 68, 70, on the inner side 66 of the tubular body 52. The fitting may be a pressure, relaxation or elastic fit. The first and second end cores 54, 56 may be optionally bonded to the tubular body 52. The resultant structure provides a substantially C-shaped magnetic core with substantially uniform ferromagnetic properties, and an accurate axial length.

Figure 3:
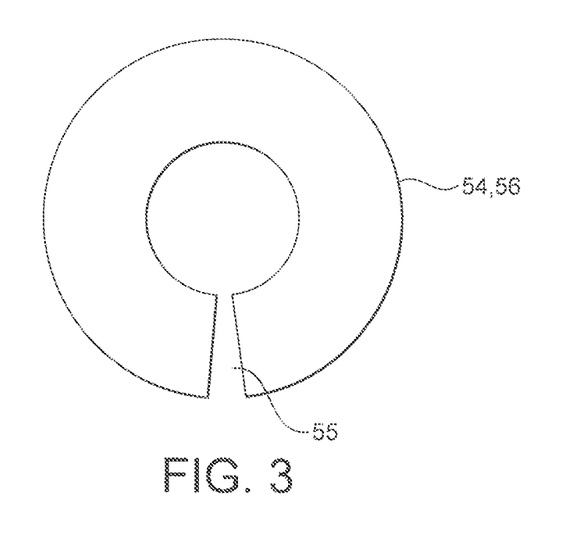
FIG. 3 is a schematic plan view of an end core part in an electromechanical generator in accordance with a second embodiment of the present invention.

In a modified embodiment, as shown in FIG. 3, the first and second end cores 54, 56 are circular and have a small angular segment cut-out or opening 55 which enables the first and second end cores 54, 56 to be press-fitted into the recess 62, 64 of the respective first and second ends 58, 60 of the tubular body 52. The first and second end cores 54, 56 are composed of a compliant material and are oversize relative to the internal dimensions of the recess 62, 64, and the elastic relaxation of the first and second end cores 54, 56 in the recess 62, 64 ensures axial retention of the first and second end cores 54, 56 in the tubular body 52 so that the magnetic core assembly has an accurate axial length. Since the magnetic field in the first and second end cores 54, 56 is radial, and a cut-out or opening 55 which is substantially radial only minimally affects the magnetic circuit. The installed first and second end cores 54, 56 exert outward pressure on the tubular body 52, which completes the required magnetic circuit efficiently.

Figure 4:
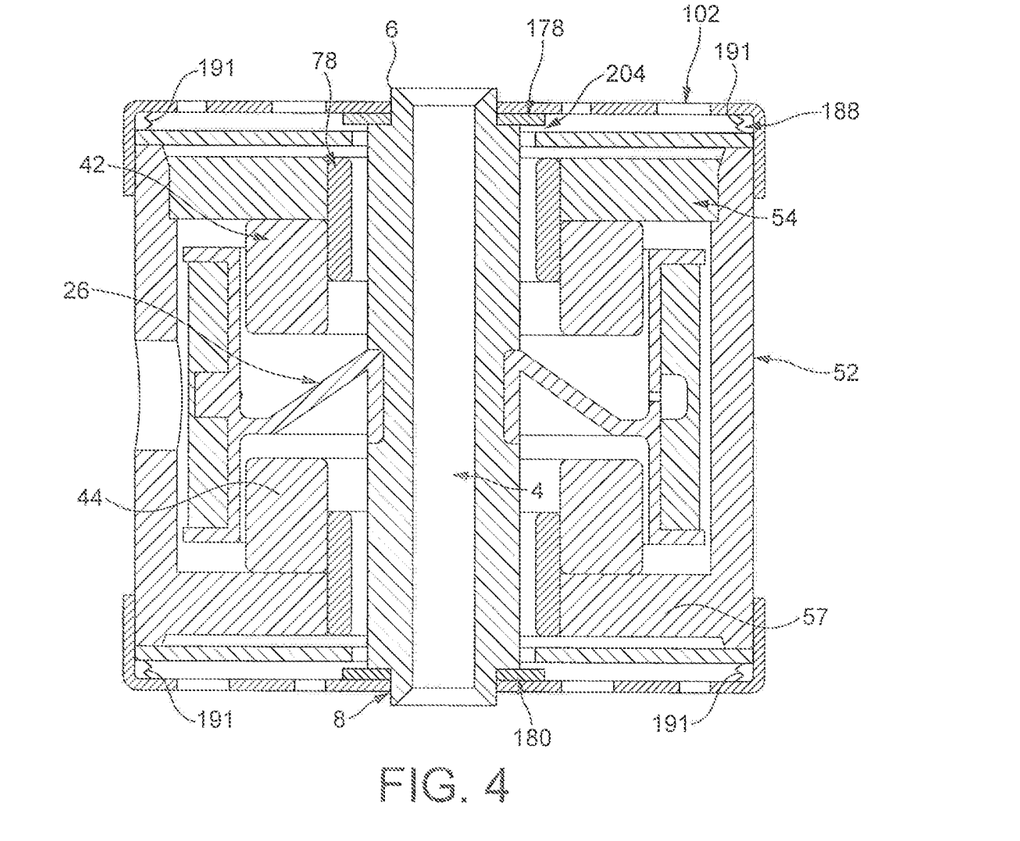
FIG. 4 is a schematic side section through an electromechanical generator for converting mechanical vibrational energy into electrical energy in accordance with a third embodiment of the present invention.

In a further embodiment, as shown in FIG. 4, one (rather than both as shown in FIG. 1) of the first and second end cores, in the illustrated embodiment the second end core 56, is integral with the tubular body 52, and the first end core 54 has the structure described above with reference to the embodiment of FIG. 1. At the opposite end, the tubular body 52 is provided with an integral end core part 57. The non-integral end core 54 may have either construction as described above, in particular either continuous or with a cut-out or opening 55 which is substantially radial.

First and second locator elements 78, 80 are respectively fitted to the first and second end cores 54, 56. The first and second locator elements 78, 80 each extend towards the mount 22. Each of the first and second locator elements 78, 80 has a locating surface 82 which engages a side surface of a respective first and second magnet 42, 44. The first and second locator elements 78, 80 are fitted to a fitting surface 84, 86 of the respective first and second end cores 54, 56, the fitting surface 84, 86 facing towards the axis A-A. The locating surface 82 of the first and second locator elements 78, 80 is fitted to a side surface 88, 90 of the respective first and second magnets 42, 44, the side surface 88, 90 facing towards the axis A-A. The first and second locator elements 78, 80 accurately and securely fit the magnets at the correct location in the magnetic core assembly 40.

The magnetic core assembly 40, comprising the radially outer core 50, first and second end cores 54, 56 and radially inner magnets 42, 44, defines therebetween an annular enclosed cavity 92 in which the coil 12 is received. The magnets 42, 44 and the outer core 50 and first and second end cores 54, 56 are slightly spaced from the coil 12 to permit relative translational movement therebetween. The magnetic core assembly 40 has a substantially C-shaped cross-section and is rotationally symmetric.

The cavity 92 has respective cavity portions between each of the first and second coil portions 13a, 13b and the central mast 4, and above or below, respectively, the conical wall 26 of the mount 22.

The outer core 50 and first and second end cores 54, 56 are composed of a ferromagnetic material having a high magnetic permeability, and a high mass, such as soft iron. The assembly of the outer core 50, first and second end cores 54, 56 and the magnets 42, 44 therefore forms two axially spaced magnetic circuits of the magnetic core assembly 40. The limits of the lines of magnetic flux of each magnetic circuit are defined by the outer core 50 and the respective first and second end cores 54, 56, which substantially prevents magnetic flux from each magnet 42, 44 extending axially or radially outwardly from the common ferromagnetic body formed of the outer core 50 and first and second end cores 54, 56. Since the opposed magnets 42, 44 face each other with common poles, at the central region of the magnetic core assembly 40 the magnetic flux of the opposed magnetic circuits are in opposition thereby directing the magnetic flux radially outwardly towards the common ferromagnetic body.

The resultant effect is that a single magnetic core assembly 40 comprises two separate magnets 42, 44 and each has a respective magnetic circuit in which a very high proportion of the magnetic flux is constrained to pass through the respective coil portion 3a, 13b. This in turn provides a very high degree of magnetic coupling between the magnets 42, 44 and the coil 12. Consequently, any relative movement between the magnets 42, 44 and the coil 12, in particular as described below by linear axial resonant movement of the magnetic core assembly 40 relative to the fixed coil 12, produces a very high electrical power output at the coil 12.

A biasing device 100 is mounted between the mast 4 and the magnetic core assembly 40 to bias the magnetic core assembly 40 in opposed directions along the axis A-A towards the equilibrium position. The biasing device 100 comprises a pair of first and second plate springs 102, 104. Each of the first and second plate springs 102, 104 has an inner edge 106, 108 respectively fitted to the first and second opposite ends 6, 8 of the mast 4 and an outer edge 114, 116 fitted to the magnetic core assembly 40. The outer edge 114 of the first plate spring 102 is fitted to a first end part 118 of the magnetic core assembly 40 and the outer edge 116 of the second plate spring 104 is fitted to a second end part 120 of the magnetic core assembly 40.

Each of the first and second plate springs 102, 104 comprises a spring member 122, 124 comprising an inner portion 126, 128, which is substantially orthogonal to the axis A-A and includes the respective inner edge 106, 108, and a cylindrical outer portion 130, 132 which is substantially parallel to the axis A-A and includes the respective outer edge 114, 116.

The spring member 122, 124 is a folded sheet spring and the inner and outer portions 126, 128; 130, 132 are connected by a fold 134, 136.

Each outer edge 114, 116 is fitted to an outer circumferential surface 138, 140 of the magnetic core assembly 40. In the illustrated embodiment, each outer edge 114, 116 is push-fitted onto the outer circumferential surface 138, 140 of the magnetic core assembly 40 and fitted thereto by an elastic fit.

The inner edge 106, 108 of each of the first and second plate springs 102, 104 is fitted to the mast 4 by a riveted joint 142, 144 between the inner edge 106, 108 and the mast 4.

The first and second plate springs 102, 104 each apply the same mechanical biasing force against the magnetic core assembly 40 when the magnetic core assembly 40 is moved away from the central equilibrium position. The first and second plate springs 102, 104 preferably have the same spring constant.

The provision of a pair of first and second plate springs 102, 104 at opposed axial ends of the movable magnetic core assembly 40 provides a structure that can not only provide a sufficient spring biased restoring force on the magnetic core assembly 40 to bias it towards an axially central position with respect to the coil 12, but also takes up substantially minimum volume within the housing. In particular, the location of the first and second plate springs 102, 104 at opposed axial ends of the movable magnetic core assembly 40 can help to maximize the size of the magnetic core assembly 40 for a given device volume which not only maximizes the magnetic coupling, but also importantly permits the mass of the movable magnetic core assembly to be correspondingly maximized. As known in the art, there is a desire to maximize the mass of the movable magnetic core assembly in a resonant vibrational electromagnetic energy harvester because this increases the output electrical power.

The provision of a pair of first and second plate springs 102, 104 also avoids the need for expensive and cumbersome helical springs surrounding the movable magnetic core assembly. This decreases the manufacturing cost by reducing the component cost.

Referring now to FIG. 2 which shows a plan view of the first and second plate springs 102, 104, the inner portion 126, 128 is substantially circular. In the illustrated embodiment, each inner portion 126, 128 has an outer circumferential part 146 adjacent to the fold 134, 136, an inner circumferential part 148 adjacent to the inner edge 106, 108, and at least three arms 150, 152, 154 connecting together the outer and inner circumferential parts 146, 148. The arms 150, 152, 154 are mutually spaced around the axis A-A and each pair of adjacent arms 150, 152, 154 is separated by a respective opening 156, 158, 160 therebetween. The arms 150, 152, 154 are equally mutually spaced around the axis A-A. With three arms 150, 152, 154, the angular separation between the same parts of adjacent arms 150, 152, 154 is 120 degrees.

Each arm 150, 152, 154 comprises a radial outer part 162 connected to the outer circumferential part 146, a middle circumferential part 164 connected to the radial outer part 162, and a radial inner part 166 connected between the middle circumferential part 164 and the inner circumferential part 148.

Each opening 156, 158, 160 comprises an outer circumferential region 168 adjacent to the outer circumferential part 146, a middle radial region 170 connected to the outer circumferential region 168, and an inner circumferential region 172 connected to the middle radial region 170 and adjacent to the inner circumferential part 148.

Each opening 156, 158, 160 extends between outer and inner opening ends 174, 176, each of the opening ends 174, 176 having an enlarged width as compared to the adjacent portion of the opening 156, 158, 160. This reduces stress concentrations in the spring.

In the illustrated embodiment, there are exactly three arms 150, 152, 154 and exactly three openings 156, 158, 160. This provides an angular separation of 120 degrees between the arms, and between the openings. In other embodiments, more than three arms and correspondingly more than three openings, are provided. For example, four, five or six arms/openings may be provided, with respective angular separations of 90, 72 and 60 degrees between the arms, and between the openings.

Preferably, as in the illustrated embodiment, the arms 150, 152, 154 have the same shape and dimensions and correspondingly the openings 156, 158, 160 have the same shape and dimensions.

The electromechanical generator 2 further comprises a pair of first and second spacers 178, 180. The first spacer 178 is fitted between the first plate spring 102 and a first surface 182 of the mast 4, and the second spacer 180 is fitted between the second plate spring 104 and a second surface 184 of the mast 4. The first and second surfaces 182, 184 are located at the respective first and second opposite ends 6, 8 of the mast 4.

A resilient device 186 is mounted between the biasing device 100 and the magnetic core assembly 40. The resilient device 186 is configured to be deformed between the biasing device 100 and the magnetic core 40 when the magnetic core assembly 40 has moved, by the linear vibrational motion, away from the equilibrium position by a predetermined non-zero threshold amplitude.

The resilient device 186 comprises a pair of first and second flat spring elements 188, 190. Each of the first and second flat spring elements 188, 190 has an outer edge 192, 194 fitted to the magnetic core assembly 40 and a free inner edge 196, 198 spaced radially outwardly from the mast 4 and spaced axially inwardly of the respective first and second plate spring 102, 104. The outer edge 192 of the first flat spring element 188 is fitted to the first end part 118 of the magnetic core assembly 40 and the outer edge 194 of the second flat spring element 190 is fitted to the second end part 120 of the magnetic core assembly 40.

Typically, the outer edge 192, 194 of each of the first and second flat spring elements 188, 190 is fitted to the magnetic core assembly 40 by being urged by a spring so as to be securely retained in position against the magnetic core assembly 40. As shown schematically in FIG. 1, a spring bias element 191 is provided between the outer edge 192, 194 and respective first or second plate spring 102, 104 which urges the outer edge 192, 194 firmly against the first or second end part 118, 120 of the magnetic core assembly 40. In an alternative, although less preferred, embodiment, the outer edge 192, 194 of each of the first and second flat spring elements 188, 190 may be otherwise fitted, for example directly fixed, to the magnetic core assembly 40.

The first and second spacers 178, 180 extend radially outwardly of the mast 4 and define respective first and second faces 200, 202 each of which is oriented inwardly towards, and spaced from, in a direction along the axis A-A, the respective free inner edge 196, 198 of the respective first and second flat spring element 188, 190. In the illustrated embodiment, the first and second faces 200, 202 are spaced from, in the direction along the axis A-A, the respective free inner edge 196, 198 of the respective first and second flat spring element 188, 190 by a respective gap 204, 206 having a predetermined length.

Preferably, only the outer edge 192, 194 of each of the first and second flat spring elements 188, 190 is in contact with any other part of the electromechanical generator 2. Each of the first and second flat spring elements 188, 190 has an inner surface 208, 210 which faces the magnetic core assembly 40, and a peripheral portion 212, 214 of each inner surface contacts the magnetic core assembly 40. The peripheral portion 212, 214 of each inner surface 208, 210 contacts an upstanding peripheral edge 216, 218 of the magnetic core assembly 40.

The high degree of magnetic coupling between the movable magnetic core assembly 40 and the coil 12, and the high mass of the movable magnetic core assembly 40, enables the resonant frequency readily to be tuned accurately to a desired value, and also permits a high self-restoring force to be applied to the movable magnetic core assembly 40 during its resonant oscillation to minimize the amplitude of the oscillation. Since the amplitude is limited, the springs 102, 104 are only ever deformed by a very small degree, well within their linear spring characteristics. Typically, under normal operation the maximum amplitude is less than about 1 mm.

The springs 102, 104 bias, back towards the central equilibrium position, the magnetic core assembly 40 which can move axially along the axis A-A when the electromechanical generator 2 is subjected to an applied mechanical force, in particular a mechanical vibration, having at least a component along the axis A-A. The springs 102, 104 have a high stiffness in the lateral, i.e. radial, direction so as substantially to prevent non-axial movement of the magnetic core assembly 40.

The generator 2 is configured such that the mass of the magnetic core assembly 40 is permitted to oscillate about the equilibrium point relative to the mast 4 with an oscillation amplitude no more than the predetermined threshold amplitude without the resilient device 186, comprising the first and second flat spring elements 188, 190, being deformed, i.e. flexed, between the biasing device 100 and the mass. Accordingly, in such a scenario of "normal operation", the resilient device 186 does not cause any power loss from the generator 2 when the oscillation amplitude of the mass is no more than the particular or predetermined threshold amplitude.

However, the generator 2 is configured such that, when the oscillation amplitude exceeds the predetermined threshold amplitude, such as when it is subjected to a severe shock, the resilient device 186 is then deformed, i.e. flexed, between the biasing device 100 and the mass to act as a limiter that limits the oscillation amplitude. Accordingly, the electromechanical generator 2 according to the preferred embodiments of the present invention has particular utility in environments where it may be subjected to occasional severe shocks.

The first and second flat spring elements 188, 190 respectively impact the first and second spacers 178, 180 to provide the amplitude limitation. The first and second spacers 178, 180 provide the advantage that the initial gap 204, 206 between the spacers 178, 180 and the flat spring elements 188, 190 can be accurately set. Therefore the first spacer 178 and the second spacer 180 can function as shims between the respective first and second plate springs 102, 104 and the mast 4, to define a predetermined distance between the first and second spaces 178, 180 and the first and second flat spring elements 188, 190. Also, the amplitude limiting motion of the first and second flat spring elements 188, 190 against the first and second spacers 178, 180 avoids or minimizes sliding motion, which eliminates or minimizes wear. The first and second flat spring elements 188, 190 may be made of phosphor-bronze and the first and second spacers 178, 180 may be made from steel. These materials can provide the required high spring constant to the flat spring elements 188, 190, which is preferably higher than the spring constant for the first and second plate springs 102.

The electromechanical generator 2 may be disposed within a housing, which may be hermetically sealed to protect the mechanical and electrical parts of the electromechanical generator 2. The interior volume of the housing may include an inert gas.

The electromechanical generator 2 uses a resonant mass-spring arrangement. If the electromechanical generator 2 is subject to a source of external vibration that causes it to move along the direction A-A, then the magnetic core assembly 40 comprises an inertial mass which may move relative to the mast 4, also along the direction A-A. In doing so, the springs 102, 104 are deformed axially, and work is done against a damper comprising the static electrical coil 12 and the movable magnetic core assembly 40 that generates a region of magnetic flux within which the electrical coil 12 is disposed. Movement of the electrical coil 12 within the magnetic flux causes an electrical current to be induced in the electrical coil 12 which can be used as a source of electrical power for driving an external device (not shown).

By increasing the electrical output, as a result of increased magnetic coupling, the operating band width of the device can be greatly increased. This in turn greatly enhances the ability of the device to be used in many new energy harvesting applications.

Simple plate springs 102, 104 can be employed in the electromechanical generator 2. This provides a reliable and simple structure to prevent lateral movement on the magnetic core assembly 40, with low friction and avoiding complicated, intricate and/or expensive manufacturing techniques. The resultant structure is robust and compact. Since the plate springs 102, 104 are subjected to a very low amplitude of deformation, their mechanical properties are not especially critical, because they are never deformed anywhere near their mechanical limits of linear elastic movement, and so they can accordingly be of relatively conventional quality, and consequently have a low component cost.

In the electromechanical generator of the preferred embodiment of the present invention a high moving mass can be achieved by filling almost all of the internal space of a housing of the device with a metallic magnetic core assembly. This can be achieved at least partly because flat springs at opposed ends of the magnetic core assembly are volume efficient. In addition, a high Q comes from the fact that the "enclosed" structure of the magnetic core assembly leaks very little flux, and so there is very little eddy current in the surrounding material of the stationary housing. Accordingly, little clearance needs to be kept between the moving magnetic core assembly and the housing, allowing more moving mass. A high magnetic coupling comes also from the enclosed nature of the magnetic core assembly where very little flux leaks out—almost all the magnetic flux gets channeled through the coil.

Other modifications and embodiments of the present invention as defined in the appended claims will be apparent to those skilled in the art.

The invention defined in the appended claims is herein called Invention A. Any aspect of Invention A may be combined with any aspect of any of Inventions B, C and D as described below in a number of Clauses. For the avoidance of doubt, any claim of Invention A is herein disclosed in claim in combination with any clause, or any combination of clauses, of any one or more of Inventions B, C and D.

Invention B

1. An electromechanical generator for converting mechanical vibrational energy into electrical energy, the electromechanical generator comprising: a central mast, an electrically conductive coil assembly fixedly mounted to the mast, the coil assembly at least partly surrounding the mast, a mount for the coil assembly extending radially inwardly of the coil assembly and fixing the coil assembly to the mast, wherein the mount comprises a conical wall extending between the coil assembly and the mast, a magnetic core assembly movably mounted to the mast for linear vibrational motion along an axis about an equilibrium position on the axis, the magnetic core assembly at least partly surrounding the coil assembly and the mast, and a biasing device mounted between the mast and the magnetic core assembly to bias the magnetic core assembly in opposed directions along the axis towards the equilibrium position.

2. An electromechanical generator according to clause 1 wherein the conical wall has opposite first and second ends, the first end having a smaller diameter than the second end, and the first end being mounted to the mast and the second end being mounted to the coil assembly.

3. An electromechanical generator according to clause 2 wherein the mount further comprises an inner wall integral with the first end, the inner wall being arcuate and fitted around at least a portion of the circumference of a middle portion of the mast.

4. An electromechanical generator according to any foregoing clause wherein the conical wall is integral with an annular coil support.

5. An electromechanical generator according to clause 4 wherein the annular coil support includes a radially oriented inner wall which connects to the conical wall.

6. An electromechanical generator according to any foregoing clause wherein the conical wall is a moulded body composed of a thermoplastic material.

7. An electromechanical generator according to clause 6 when appendant on clause 5 wherein the moulded body comprises the annular coil support and the conical wall.

8. An electromechanical generator according to any foregoing clause wherein the conical wall is inclined at an angle of from 40 to 50 degrees to the axis.

9. An electromechanical generator according to clause 8 wherein the conical wall is inclined at an angle of about 45 degrees to the axis.

10. An electromechanical generator according to any foregoing clause wherein a central part of the conical wall is located substantially midway in an axial direction along the mast.

11. An electromechanical generator according to any foregoing clause wherein the magnetic core assembly comprises two opposed magnetic circuits spaced along the axis.

12. An electromechanical generator according to any foregoing clause wherein the magnetic core assembly comprises a pair of magnets spaced along the axis, poles of the magnets having a first common polarity facing towards each other, and poles of the magnets facing away from each other being of a second common polarity, and a ferromagnetic body contacting and magnetically coupled to the poles of the magnets facing away from each other, the ferromagnetic body extending radially outwardly of the magnets relative to the axis.

13. An electromechanical generator according to clause 12 wherein the ferromagnetic body is tubular and has radially inwardly extending arms at each end thereof, each arm mounting a respective magnet thereon.

14. An electromechanical generator according to clause 12 or clause 13 wherein the ferromagnetic body comprises a radially outer portion, and opposite end portions, of the magnetic core assembly and the magnets comprise a radially inner portion of the magnetic core assembly.

Invention C

1. An electromechanical generator for converting mechanical vibrational energy into electrical energy, the electromechanical generator comprising: a central mast, an electrically conductive coil assembly fixedly mounted to the mast, the coil assembly at least partly surrounding the mast, the coil assembly having radially inner and outer sides and first and second opposite edges, a mount for the coil assembly extending radially inwardly of the radially inner side and fixing the coil assembly to the mast, a magnetic core assembly movably mounted to the mast for linear vibrational motion along an axis about an equilibrium position on the axis, the magnetic core assembly at least partly surrounding the coil assembly and the mast, wherein the magnetic core assembly comprises: an outer core, comprising a one-piece tubular body, which encloses the electrically conductive coil assembly on the radially outer side, first and second end cores magnetically coupled to the outer core at respective first and second ends of the outer core, the first and second end cores extending radially inwardly and enclosing the respective first and second opposite edges of the coil assembly, wherein either (i) both of the first and second end cores are fitted to and contact the outer core at the respective first and second ends of the outer core, or (ii) one of the first and second end cores is fitted to and contacts the outer core at the respective first or second end of the outer core and the other of the first and second end cores is integral with the outer core at the respective first or second end of the outer core, and first and second magnets spaced along the axis, wherein the first and second magnets contact and are magnetically coupled to the respective first and second end cores, and the first and second magnets define therebetween a gap in the magnetic core assembly through which the mount extends.

2. An electromechanical generator according to clause 1 wherein the first and second ends of the tubular body comprise a recess on an inner side of the tubular body, and the first and second end cores are fitted in the recess of the respective first and second ends of the tubular body.

3. An electromechanical generator according to clause 2 wherein the recess has a transverse mounting surface facing along the axis away from the equilibrium position and a longitudinal mounting surface facing towards the axis, and radial and circumferential surfaces of the respective first and second end cores are respectively fitted to the transverse and longitudinal mounting surfaces.

4. An electromechanical generator according to any foregoing clause wherein the tubular body is cylindrical.

5. An electromechanical generator according to any foregoing clause wherein the first and second end cores are circular, each having an outer circumferential surface fitted to an inner circumferential surface of the outer core and a central hole surrounding the mast.

6. An electromechanical generator according to any foregoing clause wherein the first and second end cores comprises plates.

7. An electromechanical generator according to any foregoing clause further comprising first and second locator elements respectively fitted to the first and second end cores, the first and second locator elements each extending towards the mount, and each of the first and second locator elements having a locating surface which engages a surface of a respective first and second magnet.

8. An electromechanical generator according to clause 7 wherein the first and second locator elements are fitted to a fitting surface of the respective first and second end cores, the fitting surface facing towards the axis.

9. An electromechanical generator according to clause 7 or clause 8 wherein the locating surface of the first and second locator elements is fitted to a side surface of the respective first and second magnets, the side surface facing towards the axis.

10. An electromechanical generator according to any foregoing clause wherein the magnetic core assembly comprises two opposed magnetic circuits spaced along the axis.

11. An electromechanical generator according to any foregoing clause wherein the poles of the first and second magnets have a first common polarity facing towards each other, and poles of the first and second magnets facing away from each other having a second common polarity.

12. An electromechanical generator according to any foregoing clause wherein the first and second end cores and the outer core comprise a ferromagnetic body magnetically coupled to the first and second magnets.

Invention D

1. An electromechanical generator for converting mechanical vibrational energy into electrical energy, the electromechanical generator comprising: a central mast, an electrically conductive coil assembly fixedly mounted to the mast, the coil assembly at least partly surrounding the mast, a mount for the coil assembly extending radially inwardly of the coil assembly and fixing the coil assembly to the mast, a magnetic core assembly movably mounted to the mast for linear vibrational motion along an axis about an equilibrium position on the axis, the magnetic core assembly at least partly surrounding the coil assembly and the mast, a biasing device mounted between the mast and the magnetic core assembly to bias the magnetic core assembly in opposed directions along the axis towards the equilibrium position, the biasing device comprising a pair of first and second plate springs, each of the first and second plate springs having an inner edge respectively fitted to first and second opposite ends of the mast and an outer edge fitted to the magnetic core assembly, the outer edge of the first plate spring being fitted to a first end part of the magnetic core assembly and the outer edge of the second plate spring being fitted to a second end part of the magnetic core assembly, wherein each of the first and second plate springs comprises a spring member comprising an inner portion, which is substantially orthogonal to the axis and includes the respective inner edge, and a cylindrical outer portion which is substantially parallel to the axis and includes the respective outer edge, the spring member being a folded sheet spring and the inner and outer portions are connected by a fold.

2. An electromechanical generator according to clause 1 wherein each outer edge is fitted to an outer circumferential surface of the magnetic core assembly.

3. An electromechanical generator according to clause 2 wherein each outer edge is push-fitted onto the outer circumferential surface of the magnetic core assembly.

4. An electromechanical generator according to any foregoing clause wherein the inner edge of each of the first and second plate springs is fitted to the mast by a riveted joint between the inner edge and the mast.

5. An electromechanical generator according to any foregoing clause further comprising a pair of first and second spacers, the first spacer being fitted between the first plate spring and a first surface of the mast, and the second spacer being fitted between the second plate spring and a second surface of the mast, the first and second surfaces being located at the respective first and second opposite ends of the mast.

6. An electromechanical generator according to any foregoing clause, wherein the inner portion is substantially circular.

7. An electromechanical generator according to clause 6, wherein the inner portion has an outer circumferential part adjacent to the fold, an inner circumferential part adjacent to the inner edge, and at least three arms connecting together the outer and inner circumferential parts, the arms being mutually spaced around the axis and each pair of adjacent arms being separated by a respective opening therebetween.

8. An electromechanical generator according to clause 7, wherein the arms are equally mutually spaced around the axis.

9. An electromechanical generator according to clause 7 or clause 8, wherein each arm comprises a radial outer part connected to the outer circumferential part, a middle circumferential part connected to the radial outer part, and a radial inner part connected between the middle circumferential part and the inner circumferential part.

10. An electromechanical generator according to any one of clauses 7 to 9, wherein each opening comprises an outer circumferential region adjacent to the outer circumferential part, a middle radial region connected to the outer circumferential region, and an inner circumferential region connected to the middle radial region and adjacent to the inner circumferential part.

11. An electromechanical generator according to any one of clauses 7 to 10, wherein each opening extends between outer and inner opening ends, each of the opening ends having an enlarged width as compared to the adjacent portion of the opening.

12. An electromechanical generator according to any one of clauses 7 to 11, wherein there are exactly three arms and exactly three openings.

13. An electromechanical generator according to any one of clauses 7 to 12, wherein the arms have the same shape and dimensions.

14. An electromechanical generator according to any one of clauses 7 to 13, wherein the openings have the same shape and dimensions.

15. An electromechanical generator according to any foregoing clause further comprising a resilient device mounted between the biasing device and the magnetic core assembly, the resilient device being configured to be deformed between the biasing device and the magnetic core assembly when the magnetic core assembly has moved, by the linear vibrational motion, away from the equilibrium position by a predetermined non-zero threshold amplitude, the resilient device comprising a pair of first and second flat spring elements, each of the first and second flat spring elements having an outer edge fitted to the magnetic core assembly and a free inner edge spaced radially outwardly from the mast and spaced axially inwardly of the respective first and second plate spring, the outer edge of the first flat spring element being fitted to the first end part of the magnetic core assembly and the outer edge of the second flat spring element being fitted to the second end part of the magnetic core assembly.

16. An electromechanical generator according to clause 15, when appendant on clause 5 or any clause dependent thereon, wherein the first and second spacers extend radially outwardly of the mast and define respective first and second faces each of which is oriented inwardly towards, and spaced from, in a direction along the axis, the respective free inner edge of the respective first and second flat spring element.

17. An electromechanical generator according to clause 16 wherein the first and second faces are spaced from, in the direction along the axis, the respective free inner edge of the respective first and second flat spring elements by a respective gap having a predetermined length.

18. An electromechanical generator according to any one of clauses 15 to 17 wherein only the outer edge of each of the first and second flat spring elements is in contact with any other part of the electromechanical generator.

19. An electromechanical generator according to clause 18 wherein each of the first and second flat spring elements has an inner surface which faces the magnetic core assembly, and a peripheral portion of each inner surface contacts the magnetic core assembly.

20. An electromechanical generator according to clause 19 wherein the peripheral portion of each inner surface contacts an upstanding peripheral edge of the magnetic core assembly.

21. An electromechanical generator according to any foregoing clause wherein the magnetic core assembly comprises two opposed magnetic circuits spaced along the axis.

22. An electromechanical generator according to any foregoing clause wherein the magnetic core assembly comprises a pair of magnets spaced along the axis, poles of the magnets having a first common polarity facing towards each other, and poles of the magnets facing away from each other being of a second common polarity, and a ferromagnetic body contacting and magnetically coupled to the poles of the magnets facing away from each other, the ferromagnetic body extending radially outwardly of the magnets relative to the axis.

23. An electromechanical generator according to clause 22 wherein the ferromagnetic body is tubular and has radially inwardly extending arms at each end thereof, each arm mounting a respective magnet thereon.

24. An electromechanical generator according to clause 22 or clause 23 wherein the ferromagnetic body comprises a radially outer portion, and opposite end portions, of the magnetic core assembly and the magnets comprise a radially inner portion of the magnetic core assembly.

The invention claimed is:

1. An electromechanical generator for converting mechanical vibrational energy into electrical energy, the electromechanical generator comprising:
a central mast,
an electrically conductive coil assembly fixedly mounted to the mast, the coil assembly at least partly surrounding the mast, a mount for the coil assembly extending radially inwardly of the coil assembly and fixing the coil assembly to the mast, a magnetic core assembly movably mounted to the mast for linear vibrational motion along an axis about an equilibrium position on the axis, the magnetic core assembly at least partly surrounding the coil assembly and the mast, a biasing device mounted between the mast and the magnetic core assembly to bias the magnetic core assembly in opposed directions along the axis towards the equilibrium position, the biasing device comprising a pair of first and second plate springs, each of the first and second plate springs having an inner edge respectively fitted to first and second opposite ends of the mast and an outer edge fitted to the magnetic core assembly, the outer edge of the first plate spring being fitted to a first end part of the magnetic core assembly and the outer edge of the second plate spring being fitted to a second end part of the magnetic core assembly, and a resilient device mounted between the biasing device and the magnetic core assembly, the resilient device being configured to be deformed between the biasing device and the magnetic core assembly when the magnetic core assembly has moved, by the linear vibrational motion, away from the equilibrium position by a predetermined non-zero threshold amplitude, the resilient device comprising a pair of first and second flat spring elements, each of the first and second flat spring elements having an outer edge fitted to the magnetic core assembly and a free inner edge spaced radially outwardly from the mast and spaced axially inwardly of the respective first and second plate spring.

2. An electromechanical generator according to claim 1 wherein each of the first and second plate springs comprises a spring member comprising an inner portion, which is substantially orthogonal to the axis and includes the respective inner edge, and a cylindrical outer portion which is substantially parallel to the axis and includes the respective outer edge.

3. An electromechanical generator according to claim 2 wherein the spring member is a folded sheet spring and the inner and outer portions are connected by a fold.

4. An electromechanical generator according to claim 2 wherein each outer edge is fitted to an outer circumferential surface of the magnetic core assembly.

5. An electromechanical generator according to claim 4 wherein each outer edge is push-fitted onto the outer circumferential surface of the magnetic core assembly and fitted thereto by an elastic fit.

6. An electromechanical generator according to claim 1 further comprising a pair of first and second spacers, the first spacer being fitted between the first plate spring and a first surface of the mast, and the second spacer being fitted between the second plate spring and a second surface of the mast, the first and second surfaces being located at the respective first and second opposite ends of the mast.

7. An electromechanical generator according to claim 6 wherein the first and second spacers extend radially outwardly of the mast and define respective first and second faces each of which is oriented inwardly towards, and spaced from, in a direction along the axis, the respective free inner edge of the respective first and second flat spring elements.

8. An electromechanical generator according to claim 7 wherein the first and second faces are spaced from, in the direction along the axis, the respective free inner edge of the respective first and second flat spring elements by a respective gap having a predetermined length.

9. An electromechanical generator according to claim 1 wherein only the outer edge of each of the first and second flat spring elements is in contact with any other part of the electromechanical generator.

10. An electromechanical generator according to claim 9 wherein each of the first and second flat spring elements has an inner surface which faces the magnetic core assembly, and a peripheral portion of each inner surface contacts the magnetic core assembly.

11. An electromechanical generator according to claim 10 wherein the peripheral portion of each inner surface contacts an upstanding peripheral edge of the magnetic core assembly.

12. An electromechanical generator according to claim 1 wherein the outer edge of each of the first and second flat spring elements is fitted to the magnetic core assembly by being urged by a spring so as to be securely retained in position against the magnetic core assembly.

13. An electromechanical generator according to claim 1 wherein the inner edge of each of the first and second plate springs is fitted to the mast by a riveted joint between the inner edge and the mast.

14. An electromechanical generator according to claim 1 wherein the magnetic core assembly comprises two opposed magnetic circuits spaced along the axis.

15. An electromechanical generator according to claim 1 wherein the magnetic core assembly comprises a pair of magnets spaced along the axis, poles of the magnets having a first common polarity facing towards each other, and poles of the magnets facing away from each other being of a second common polarity, and a ferromagnetic body contacting and magnetically coupled to the poles of the magnets facing away from each other, the ferromagnetic body extending radially outwardly of the magnets relative to the axis.

16. An electromechanical generator according to claim 15 wherein the ferromagnetic body is tubular and has radially inwardly extending arms at each end thereof, each arm mounting a respective magnet thereon.

17. An electromechanical generator according to claim 15 wherein the ferromagnetic body comprises a radially outer portion, and opposite end portions, of the magnetic core assembly and the magnets comprise a radially inner portion of the magnetic core assembly.

* * * * *